(12) United States Patent
Tuli (10) Patent No.: US 7,023,572 B2
(45) Date of Patent: Apr. 4, 2006

(54) PORTABLE HIGH SPEED INTERNET ACCESS DEVICE

(76) Inventor: Raja Singh Tuli, 1155 Rene Levesque West #3500, Montreal, Quebec (CA) H3B 3T6

( * ) Notice: Subject to any disclaimer, the term of this patent is extended or adjusted under 35 U.S.C. 154(b) by 390 days.

(21) Appl. No.: 09/803,884

(22) Filed: Mar. 13, 2001

(65) Prior Publication Data

US 2002/0030844 A1 Mar. 14, 2002

Related U.S. Application Data

(63) Continuation-in-part of application No. 09/496,172, filed on Feb. 2, 2000.

(51) Int. Cl.
*G06F 15/00* (2006.01)

(52) U.S. Cl. ..................... 358/1.15; 358/1.16; 358/1.17

(58) Field of Classification Search ................ 715/513; 709/203, 200; 345/700, 339; 707/10; 380/270; 358/1.15, 1.16, 1.17

See application file for complete search history.

(56) References Cited

U.S. PATENT DOCUMENTS

| 4,899,394 A | 2/1990 | Lee |
| 5,161,213 A | 11/1992 | Knowlton |
| 5,355,447 A | 10/1994 | Knowlton |
| 5,379,057 A | 1/1995 | Clough et al. |
| 5,444,763 A | 8/1995 | Lazaridis et al. |
| 5,534,893 A | 7/1996 | Hansen, Jr. et al. |
| 5,546,524 A | 8/1996 | Chow et al. |
| 5,546,538 A | 8/1996 | Cobbley et al. |
| 5,555,241 A | 9/1996 | Lazaridis et al. |
| 5,559,800 A | 9/1996 | Mousseau et al. |
| 5,581,243 A | 12/1996 | Ouellette et al. |
| 5,600,790 A | 2/1997 | Barnstijn et al. |
| 5,657,345 A | 8/1997 | Lazaridis |
| 5,682,525 A | 10/1997 | Bouve et al. |
| 5,699,255 A | 12/1997 | Ellis et al. |
| 5,701,451 A | 12/1997 | Rogers et al. |
| 5,721,908 A | 2/1998 | Lagarde et al. |
| 5,727,159 A | 3/1998 | Kikinis |
| 5,758,110 A | 5/1998 | Boss et al. |

(Continued)

FOREIGN PATENT DOCUMENTS

EP  0 833 260  1/1998

(Continued)

OTHER PUBLICATIONS

International Search Report, PCT/US 01/03382, 1 pages, 2001.

(Continued)

*Primary Examiner*—Twyler M. Lamb
(74) *Attorney, Agent, or Firm*—Blakely, Sokoloff, Taylor & Zafman LLP (57) ABSTRACT

The invention discloses a portable device providing access to the Internet. A host computer runs a browser taking information received from the Internet, renders it onto a virtual display in memory, reduces the color depth, compress and sends it to the device. Thus, the user views a bit map or raster image of a Web page on the device, which also contains a browser software program, that runs on the device containing its own window. This window contains buttons or icons providing web functions and implements scrolling on the web page received with respect to the window. The windows of the browsers in the host computer and device are adjustable in size and may be set to match for text formatting. The size of the web page received from the Internet is the size sent to the device when converted to an image, which varies with each web page received.

33 Claims, 3 Drawing Sheets

U.S. PATENT DOCUMENTS

| | | | |
|---|---|---|---|
| 5,761,663 A | 6/1998 | Lagarde et al. | |
| 5,764,235 A | 6/1998 | Hunt et al. | |
| 5,765,176 A | 6/1998 | Bloomberg | |
| 5,768,483 A | 6/1998 | Maniwa et al. | |
| 5,778,092 A | 7/1998 | MacLeod et al. | |
| 5,793,964 A | 8/1998 | Rogers et al. | |
| 5,802,312 A | 9/1998 | Lazaridis et al. | |
| 5,809,415 A | 9/1998 | Rossmann | |
| 5,810,680 A | 9/1998 | Lobb et al. | |
| 5,831,679 A | 11/1998 | Montgomery et al. | |
| 5,838,906 A | 11/1998 | Doyle et al. | |
| 5,845,076 A | 12/1998 | Arakawa | |
| 5,856,827 A | 1/1999 | Sudo | |
| 5,862,348 A | 1/1999 | Pedersen | |
| 5,867,662 A | 2/1999 | Riggs | |
| 5,867,821 A * | 2/1999 | Ballantyne et al. | 705/2 |
| 5,884,014 A | 3/1999 | Huttenlocher et al. | |
| 5,884,056 A | 3/1999 | Steele | |
| 5,893,095 A | 4/1999 | Jain et al. | |
| 5,910,805 A | 6/1999 | Hickey et al. | |
| 5,915,250 A | 6/1999 | Jain et al. | |
| 5,923,736 A | 7/1999 | Shachar | |
| 5,925,103 A | 7/1999 | Magallanes et al. | |
| 5,928,324 A * | 7/1999 | Sloan | 709/203 |
| 5,938,737 A | 8/1999 | Smallcomb et al. | |
| 5,949,412 A | 9/1999 | Huntsman | |
| 5,949,875 A | 9/1999 | Walker et al. | |
| 5,956,716 A | 9/1999 | Kenner et al. | |
| 5,961,586 A | 10/1999 | Pedersen | |
| 5,961,603 A | 10/1999 | Kunkel et al. | |
| 5,966,135 A | 10/1999 | Roy et al. | |
| 5,974,441 A | 10/1999 | Rogers et al. | |
| 5,978,835 A | 11/1999 | Ludwig et al. | |
| 5,987,256 A | 11/1999 | Wu et al. | |
| 5,995,102 A * | 11/1999 | Rosen et al. | 345/856 |
| 5,995,105 A | 11/1999 | Reber et al. | |
| 6,003,065 A | 12/1999 | Yan et al. | |
| 6,006,105 A | 12/1999 | Rostoker et al. | |
| 6,006,231 A | 12/1999 | Popa | |
| 6,006,241 A | 12/1999 | Purnaveja et al. | |
| 6,008,836 A | 12/1999 | Bruck et al. | |
| 6,011,546 A | 1/2000 | Bertram | |
| 6,011,905 A | 1/2000 | Huttenlocher et al. | |
| 6,012,083 A | 1/2000 | Savitzky et al. | |
| 6,012,086 A | 1/2000 | Lowell | |
| 6,014,133 A | 1/2000 | Yamakado et al. | |
| 6,014,694 A | 1/2000 | Aharoni et al. | |
| 6,014,706 A | 1/2000 | Cannon et al. | |
| 6,016,535 A | 1/2000 | Krantz et al. | |
| 6,021,409 A | 2/2000 | Burrows | |
| 6,023,749 A | 2/2000 | Richardson | |
| 6,026,435 A | 2/2000 | Enomoto et al. | |
| 6,034,686 A | 3/2000 | Lamb et al. | |
| 6,035,281 A | 3/2000 | Crosskey et al. | |
| 6,047,047 A | 4/2000 | Aldridge et al. | |
| 6,049,539 A | 4/2000 | Lee et al. | |
| 6,049,821 A | 4/2000 | Theriault et al. | |
| 6,049,831 A | 4/2000 | Gardell et al. | |
| 6,052,130 A | 4/2000 | Bardon et al. | |
| 6,054,985 A | 4/2000 | Morgan et al. | |
| 6,057,857 A | 5/2000 | Bloomfield | |
| 6,065,057 A | 5/2000 | Rosen et al. | |
| 6,065,800 A | 5/2000 | Olson | |
| 6,067,571 A | 5/2000 | Igarashi et al. | |
| 6,072,483 A | 6/2000 | Rosin et al. | |
| 6,072,598 A | 6/2000 | Tso | |
| 6,073,168 A | 6/2000 | Mighdoll et al. | |
| 6,073,483 A | 6/2000 | Nitecki et al. | |
| 6,081,623 A | 6/2000 | Bloomfield et al. | |
| 6,084,584 A | 7/2000 | Nahi et al. | |
| 6,087,952 A | 7/2000 | Prabhakaran | |
| 6,092,107 A | 7/2000 | Eleftheriadis et al. | |
| 6,097,352 A | 8/2000 | Zavracky et al. | |
| 6,101,180 A | 8/2000 | Donahue et al. | |
| 6,104,392 A | 8/2000 | Shaw et al. | |
| 6,105,021 A | 8/2000 | Berstis | |
| 6,108,655 A | 8/2000 | Schleimer et al. | |
| 6,108,727 A | 8/2000 | Boals et al. | |
| 6,118,449 A | 9/2000 | Rosen et al. | |
| 6,118,899 A | 9/2000 | Bloomfield et al. | |
| 6,119,135 A | 9/2000 | Helfman | |
| 6,121,970 A | 9/2000 | Guedalia | |
| 6,125,209 A | 9/2000 | Dorricott | |
| 6,138,156 A | 10/2000 | Fletcher et al. | |
| 6,157,935 A | 12/2000 | Tran et al. | |
| 6,182,054 B1 | 1/2001 | Dickinson et al. | |
| 6,182,127 B1 | 1/2001 | Cronin, III et al. | |
| 6,185,625 B1 | 2/2001 | Tso et al. | |
| 6,192,393 B1 | 2/2001 | Tarantino et al. | |
| 6,195,667 B1 | 2/2001 | Duga et al. | |
| 6,201,611 B1 | 3/2001 | Carter et al. | |
| 6,219,465 B1 | 4/2001 | Nacman et al. | |
| 6,226,400 B1 | 5/2001 | Doll | |
| 6,233,541 B1 | 5/2001 | Butts et al. | |
| 6,243,761 B1 | 6/2001 | Mogul et al. | |
| 6,256,750 B1 | 7/2001 | Takeda | |
| 6,262,732 B1 | 7/2001 | Coleman et al. | |
| 6,263,347 B1 | 7/2001 | Kobayashi et al. | |
| 6,269,481 B1 | 7/2001 | Perlman et al. | |
| 6,282,294 B1 * | 8/2001 | Deo et al. | 380/270 |
| 6,285,461 B1 | 9/2001 | Fujii et al. | |
| 6,286,003 B1 | 9/2001 | Muta | |
| 6,295,059 B1 | 9/2001 | Lentz et al. | |
| 6,298,162 B1 | 10/2001 | Sutha et al. | |
| 6,304,928 B1 | 10/2001 | Mairs et al. | |
| 6,313,880 B1 | 11/2001 | Smyers et al. | |
| 6,317,781 B1 | 11/2001 | De Boor et al. | |
| 6,345,279 B1 | 2/2002 | Li et al. | |
| 6,356,283 B1 * | 3/2002 | Guedalia | 345/760 |
| 6,359,603 B1 | 3/2002 | Zwern | |
| 6,404,416 B1 | 6/2002 | Kahn et al. | |
| 6,411,275 B1 | 6/2002 | Hedberg | |
| 6,418,310 B1 | 7/2002 | Dent | |
| 6,424,369 B1 | 7/2002 | Adair et al. | |
| 6,433,801 B1 | 8/2002 | Moon et al. | |
| 6,449,639 B1 | 9/2002 | Blumberg | |
| 6,466,198 B1 | 10/2002 | Feinstein | |
| 6,473,097 B1 * | 10/2002 | Elliott | 715/733 |
| 6,477,143 B1 | 11/2002 | Ginossar | |
| 6,480,710 B1 | 11/2002 | Laybourn et al. | |
| 6,487,597 B1 | 11/2002 | Horie et al. | |
| 6,535,743 B1 | 3/2003 | Kennedy, III et al. | |
| 6,536,043 B1 | 3/2003 | Guedalia | |
| 6,539,077 B1 | 3/2003 | Ranalli et al. | |
| 6,544,295 B1 | 4/2003 | Bodnar | |
| 6,553,240 B1 | 4/2003 | Dervarics | |
| 6,553,412 B1 | 4/2003 | Kloba et al. | |
| 6,560,621 B1 | 5/2003 | Barile | |
| 6,564,250 B1 | 5/2003 | Nguyen | |
| 6,565,611 B1 | 5/2003 | Wilcox et al. | |
| 6,571,245 B1 | 5/2003 | Huang et al. | |
| 6,574,501 B1 | 6/2003 | Lambert et al. | |
| 6,598,087 B1 | 7/2003 | Dixon, III et al. | |
| 6,615,234 B1 | 9/2003 | Adamske et al. | |
| 6,628,243 B1 | 9/2003 | Lyons et al. | |
| 6,631,247 B1 | 10/2003 | Motoyama et al. | |
| 6,633,314 B1 | 10/2003 | Tuli | |
| 6,674,445 B1 | 1/2004 | Chithambaram et al. | |
| 6,677,965 B1 | 1/2004 | Ullmann et al. | |
| 6,690,403 B1 | 2/2004 | Tuli | |
| 2001/0034770 A1 | 10/2001 | O'Brien | |
| 2001/0047441 A1 | 11/2001 | Robertson | |
| 2001/0052911 A1 | 12/2001 | Boyle et al. | |
| 2002/0015042 A1 | 2/2002 | Robotham | |

| | | |
|---|---|---|
| 2002/0018234 A1 | 2/2002 | Fu et al. |
| 2003/0074672 A1* | 4/2003 | Daniels ..................... 725/110 |

FOREIGN PATENT DOCUMENTS

| | | |
|---|---|---|
| EP | 0 889 402 A | 1/1999 |
| EP | 0 889 636 A | 1/1999 |
| EP | 890922 A2 | 1/1999 |
| EP | 1 001 613 A | 5/2000 |
| EP | 1026578 A2 | 8/2000 |
| EP | 1043876 A2 | 10/2000 |
| EP | 1109113 A2 | 6/2001 |
| GB | 2347766 A | 9/2000 |
| WO | WO 97 30556 A | 8/1997 |
| WO | WO 97 38389 A | 10/1997 |
| WO | WO 98 40842 A | 9/1998 |
| WO | WO 98 43177 A | 10/1998 |
| WO | WO 99 09658 A | 2/1999 |
| WO | WO 99/48007 | 9/1999 |
| WO | WO 0033232 A2 | 6/2000 |
| WO | WO 01/09836 A | 2/2001 |

OTHER PUBLICATIONS

International Search Report, PCT/CA 01/00114, 3 pages, 2001.
International Search Report, PCT/CA 01/00126, 3 pages, 2001.
International Search Report, PCT/CA 01/00170, 4 pages, 2002.
International Search Report, PCT/CA 01/00169, 3 pages, 2002.
International Search Report, PCT/CA 02/00048, 5 pages, 2003.
Tagawa Norio, "Data Relay System and Data Repeater Applied to the System", Patent Abstracts of Japan, vol. 1997, No. 10, Jun. 24, 1997.
Armando Fox et al, "Experience with Top Gun Wingman: a proxy-based graphical web browser fro the 3Com PalmPilot", *Middleware*, IFIP International Conference on Distributed Systems, Platforms and Open Distributed Processing, Sep. 1998, pp. 407-424.
Richard Han, et al., "Dynamic Adaptation in an Image Transcoding Proxy for Mobile Web Browsing", *IEEE Personal Communication*, Dec. 1998, pp. 8-17.
Timothy Bickmore, et al., "Web Page Filtering and Re-Authoring for Mobile Users", *The Computer Journal*, vol. 42, No. 6, 1999.
Tristan Richardson, Quentin Stafford-Fraser, Kenneth R. Wood & Andy Hopper, "Virtual Network Computing", *IEEE Internet Computing*, vol. 2, No. 1, Jan./Feb. 1998 pp33-38.
Citrix Systems, Inc.: "Citrix Announces New Product Product Enhancements that Speed Web Application", http://www.citrix.com/press/news/releases/20000905_product_enhance.asp, Sep. 5, 2000.
Boutell, T. et al., "PNG (Portable Network Graphics) Specification Version 1.0" RFC 2083, pp. 1-102, Mar. 1997.
Halfhill, T.R., "Good-Bye GUI . . . Hello, NUI," BYTE Magazine, www.byte.com, vol. 22, No. 7, pp. 60-64, 66, 68, 70, and 72, Jul. 1997.
Masinter, L., "Returning Values from Forms: multipart/form-data," RFC 2388, pp. 1-9, Aug. 1998.
Jao, C.S. et al., "The display of photographic-quality images on the Web: a comparison of two technologies," IEEE Transactions on Information Technology In Biomediciene, vol. 3, iss. 1, pp. 70-73, Mar. 1999.
Kaljuvee, O. et al., "Efficient Web form entry on PDAs," ACM Proceedings of the tenth International Conference on WWW, ACM Press, ISBN: 1-58113-348-0, pp. 663-672, May 2001.
Selected pages from AT&T Wireless, Bell Atlantic Mobile, and Nextel, as delivered through the Wayback Machine, web.archieve.org.
Lewis, Ted. "Information Appliances: Gadget Netopia" *Computer*, vol. 31, issue 1, Jan. 1998, pp. 59-68.
Cimini, Leonard J., Jr., et al. "Advanced Cellular Internet Service (ACIS)", *IEEE communication Magazine*, vol. 36, Issue 10, Oct. 1998, pp. 150-159.
Oliphant, Malcolm W. "The Mobile Phone Meets the Internet", *IEEE Spectrum*, vol. 36, Issue 8, Aug. 1999, pp. 20-28.
Lind, R., et al. "The Network Vehicle—A Glimpse into the Future of Mobile Multi-Media", *IEEE ASE Systems Magazine*, Sep. 1999, pp. 27-32.
Gbaguidi, Constant, et al. "A programmable Architecture for the Provision of Hybrid Services", *IEEE communications Magazine*, vol. 27, Issue 7, Jul. 1999, pp. 110-116.
Narayanaswamy, Shankar, et al. "User Interface for a PCS Smart Phone", *IEEE Int.. Conference on Multimedia Computing and Systems*, vol. 1 Jun. 1999, pp. 777-781.
Rumba Technical Bulletin, "Configuring RUMBA LPR & LPD (16-bit)," 1996, from the web: 156.27.8.200/ts_rumba/solution/pdf/TCPIP/4002.pdf, pp. 1-11.
International Search Report, PCT/CA 02/00133, 3 pages, 2003.
International Search Report, PCT/CA 02/00048, 3 pages, 2003.
U.S. Appl. No. 09/496,172, filed Feb. 2, 2000.
U.S. Appl. No. 09/498,725, filed Feb. 7, 2000.
U.S. Appl. No. 09/501,585, filed Feb. 10, 2000.
U.S. Appl. No. 09/504,807, filed Feb. 16, 2000.
U.S. Appl. No. 09/504,808, filed Feb. 16, 2000.
U.S. Appl. No. 09/504,809, filed Feb. 16, 2000.
U.S. Appl. No. 09/625,272, filed Jul. 25, 2000.
U.S. Appl. No. 09/637,628, filed Aug. 14, 2000.
U.S. Appl. No. 09/650,412, filed Aug. 29, 2000.
U.S. Appl. No. 09/677,857, filed Oct. 3, 2000.
U.S. Appl. No. 09/688,879, filed Oct. 17, 2000.
U.S. Appl. No. 09/698,050, filed Oct. 30, 2000.
U.S. Appl. No. 09/708,031, filed Nov. 8, 2000.
U.S. Appl. No. 09/764,418, filed Jan. 19, 2001.
U.S. Appl. No. 09/768,135, filed Jan. 24, 2001.
U.S. Appl. No. 09/781,265, filed Feb. 13, 2001.
U.S. Appl. No. 09/879,972, filed Jun. 14, 2001.
U.S. Appl. No. 10/238,643, filed Sep. 11, 2002.
U.S. Appl. No. 10/308,237, filed Dec. 3, 2002.
U.S. Appl. No. 10/448,700, filed May 29, 2003.
U.S. Appl. No. 10/779,441, filed Feb. 13, 2004.
U.S. Appl. No. 10/793,534, filed Mar. 2, 2004.
International Search Report, PCT/CA 01/01057, 2 pages, 2003.
Joel F. Bartlett. "Experience with a Wireless World Wide Web Client", Mar., 1995.

* cited by examiner

PORTABLE HIGH SPEED INTERNET ACCESS DEVICE

"This application is a continuation in part of application Ser. No. 09/496,172 filed on Feb. 2, 2000."

PRIOR ART

The background of the present invention includes U.S. Pat. No. 5,925,103, Internet Access Device, which describes an improved Internet access system, vastly different from the present invention. Other prior art would include palm top computers and hand-held computers that have limited processing power due to design restrictions. Thus, these computers are much slower for accessing the Internet and World Wide Web.

BACKGROUND OF THE INVENTION

The present invention provides a remote Internet access device with enhanced scrolling features on the device, which is an important aspect of the Internet experience. The result is an Internet access solution with rapid scrolling that occurs locally on the device. A PDA browser software program runs on the device which has its own window, and within this window the web page image is moveable at the device.

SUMMARY

It is an object of the present invention to disclose a portable device that can access the Internet and World Wide Web, at extremely low costs. It is another object of the present invention to provide fast access to parts of a web page received from the Internet, by scrolling locally on the device without communication to a host computer.

The principal embodiment of the present invention discloses a portable device that comprises a modem that connects to a cellular telephone. Thus, the device has a wireless connection to the Internet. A host computer that runs a browser takes information received from the Internet and renders it onto a virtual display in its memory, reduces the color depth of the information to a lower depth color image, then compresses it and sends it to the portable device of the invention, for displaying to the user. Hence, the portable device receives a compressed image, decompresses it, stores it into memory, and displays it for view. Thus, the user views a bit map image of a Web page.

The portable device contains a PDA browser software which runs on the device containing its own window, and within this window the web page image is moveable at the device. Both windows of the browser in the host computer and the PDA browser software are adjustable and may be set to match each other for improved text formatting. The host computer is not involved in the scrolling function as in other devices that allow Internet access. Buttons or icons in the PDA browser window provide web functions and implement scrolling of the web page with respect to this window. The portable device or the host computer may format the width of the image in the browser window of the host computer, i.e. the liquid width of the web page. The size of each web page received from outside is the same size that is sent to the portable device when converted to an image, and this varies with each web page received. The CPU present in the portable device performs all scrolling functions, with messages sent to the host computer informing of each scroll instruction. This allows the host computer to move its browser window to the newly scrolled area. Icons or buttons in the PDA browser window are mapped to similar icons or buttons in the host computer, such that by clicking on an icon or button in the PDA browser window sends a message to the host computer to click down in the same icon or button in the browser in the host computer. Clicking in an area of the PDA browser window sends a message to the host computer to provide a click down in the same location of the web page, whereby a new web page is loaded, color reduced, compressed and sent to the portable device.

DETAILED DESCRIPTION OF THE DRAWINGS

The invention is described in more detail below with respect to an illustrative embodiment shown in the accompanying drawings in which.

DETAILED DESCRIPTION OF THE PRESENT INVENTION

To facilitate description, any numeral identifying an element in one figure will represent the same element in any other figure.

The principal embodiment of the present invention aims to provide a portable device that allows a user to access the Internet or the World Wide Web (WWW), which is a device similar to a portable computer. It is another aim of the present invention, to provide a method to develop a cost competitive device. It is a further aim of the present invention to provide a means for rapidly scrolling around an image displayed on the portable device.

Currently, existing portable devices such as the Palm Pilot VII and Windows CE type devices contain an operating system, and within the operating system a mini-browser to interpret information received from the WWW or Internet and then display this information on the screen. This requires a powerful microprocessor. Such existing portable devices do not provide rapid scrolling within an opened application program, as each scroll command is sent to the host computer and a refreshed image is sent back to the portable device. This process is slow and tedious unlike the scrolling method performed directly on the portable device of the present invention.

Figure 1:
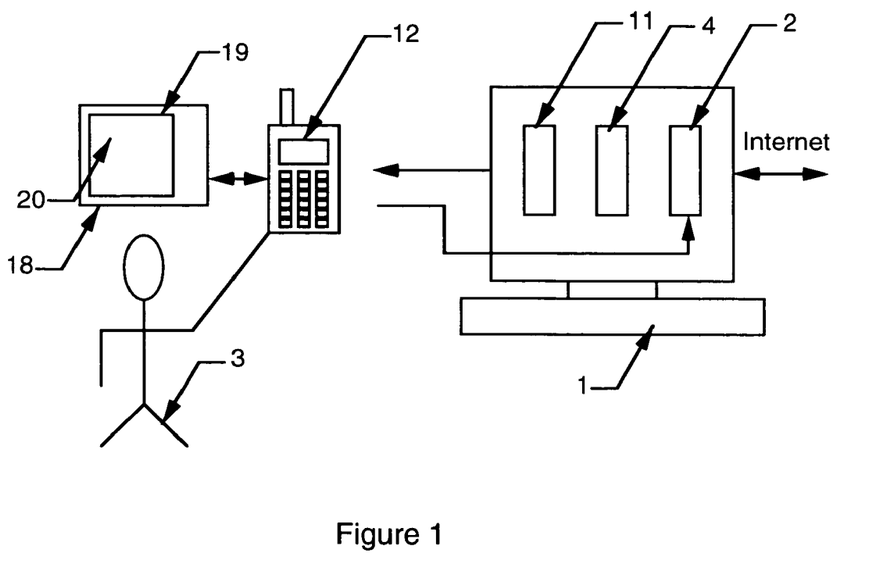
FIG. 1 illustrates elements in the host computer, which communicates with a remote user and the portable device of the invention.

The principal embodiment of the present invention is disclosed in FIG. 1. A host computer 1 is depicted which is connected to the Internet, and that host computer receives information from outside in the form of HTML or JAVA or other formats, required to generate a web page. Running in the host computer, is a browser program 2 that receives all its information from outside and renders it onto a virtual display in its memory, hence a bitmap is made out of it. When a remote user 3 requests to view a Web page (or electronic message, etc.) the host computer 1 receives HTML, JAVA, or other types of information from a web server outside the computer (as information may be gathered from a variety of different sources) and the browser program 2 takes all information received from outside and renders it onto a virtual display in its memory. What is therefore rendered in the memory is a web page and this information is directed to another software 4, which reduces the color depth of the information (i.e. the entire image comprising graphics and text) which is usually received in 24 bit color, subsequently reduced to a black and white bit map or raster image, in the preferred embodiment. Even though text may appear in black and white, the entire image may be 24 bit color which is reduced to black and white. This reduced image is then compressed entirely using a loss-less method of compression by software 11, implementing G3 or G4 methods in the preferred embodiment. This compressed image is sent through a port in the host computer 1, in the preferred embodiment, to the cellular telephone 12 of FIG. 1, which is connected to the portable high speed internet access device 18 of the invention. The portable device 18, which contains a display screen 20 with a transparent touch panel and related microelectronics, receives the compressed image, decompresses the image, stores it into internal memory, and displays it for viewing to the user 3.

In another embodiment, the cellular phone 12 of FIG. 1 can be replaced by a wire less modem which is connected to the portable high speed internet access device 18 of the invention. This enables the portable device 18 to receive the compressed image, decompresses the image, store it into internal memory, and display it for viewing by the user 3.

In another embodiment, the cellular phone 12 of FIG. 1 can be replaced by a LAND line or PSTN which is connected to the portable high speed internet access device 18 of the invention. This enables the portable device 18 to receive the compressed image, decompresses the image, store it into internal memory, and display it for viewing by the user 3.

In another embodiment of the invention, after the browser program 2 takes information received from outside and renders it onto a virtual display in its memory, this information is directed to software 4, whereby the color depth of the information is reduced into a gray scale image. This reduced image is then compressed by software 11 and sent to the portable high speed Internet access device 18 of the invention, for displaying to the user 3.

In a further embodiment of the invention, after the browser program 2 takes information received from outside and renders it onto a virtual display in its memory, this information is directed to software 4, whereby the color depth of the information is reduced to any lower depth color image. This reduced image is then compressed by software 11 and sent to the portable high speed Internet access device 18 of the invention, for displaying to the user 3.

In another embodiment of the invention, the browser program 2 takes information received from outside and renders it onto a virtual display in its memory, but not at the high depth of color as originally received. The browser 2 renders the image in a lower depth of color, such as a black and white image, in the preferred embodiment. Hence, the software 4 is not required for reducing the color depth of the information as the browser program 2 also performs this task. This reduced image is then compressed by software 11 and sent to the portable high speed Internet access device 18 of the invention, for displaying to the user 3.

In another embodiment of the invention, the browser program 2 takes information received from outside and renders it onto a virtual display in its memory, but not at the high depth of color as originally received. The browser 2 renders the image in a lower depth of color, such as a gray scale image, in this embodiment. Hence, the software 4 is not required for reducing the color depth of the information as the browser program 2 also performs this task. This reduced image is then compressed by software 11 and sent to the portable high speed Internet access device 18 of the invention, for displaying to the user 3.

Figure 2:
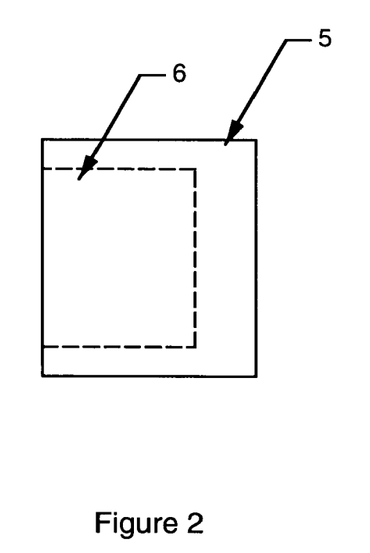
FIG. 2 illustrates the image to be displayed compared with the displayable area of a browser window.

The image 5, as shown in FIG. 2, contains the information that would normally be displayed on a single Web page. As can be seen in FIG. 2, the image 5 of the web page that is rendered by the browser 2 onto a virtual display in its memory is usually larger than the virtual window 6 of the browser. The entire image 5 of the web page is sent to the portable device 18, to be displayed. The window 6 of the browser 2 running in the host computer 1 is set to be the same size as the display window 19 of the portable device 18, because the portable device's display window is small, and most likely the web page is larger than the window of the browser in the host computer. The reason for setting the browser's window to be the same size as the portable device's window is for formatting purposes, so that text can be formatted to comfortably fit the size of the web page to be better displayed without being cut off at the left or right edges, making it easy to read. In a regular browser, when the width of the window is reduced some pages are automatically formatted so that they fit left-to-right justified in that window, and the user can view the entire image by only having to scroll up and down, without also having to scroll left-to-right. In many of the pages that are displayed, when they are formatted on the web page they get formatted such that the left-to-right formatting fits within the window of the browser so that the user does not have to scroll left-to-right, but only has to scroll up and down. In the preferred embodiment of the invention, the entire web page which is much larger than both the browser's window and the portable device's window, is rendered onto a virtual display in memory by the browser 2 in the host computer 1, the color depth reduced, and the image compressed and sent to the portable device. The portable device receives this image, decompresses it, stores it into memory and displays it to the user.

Figure 4:
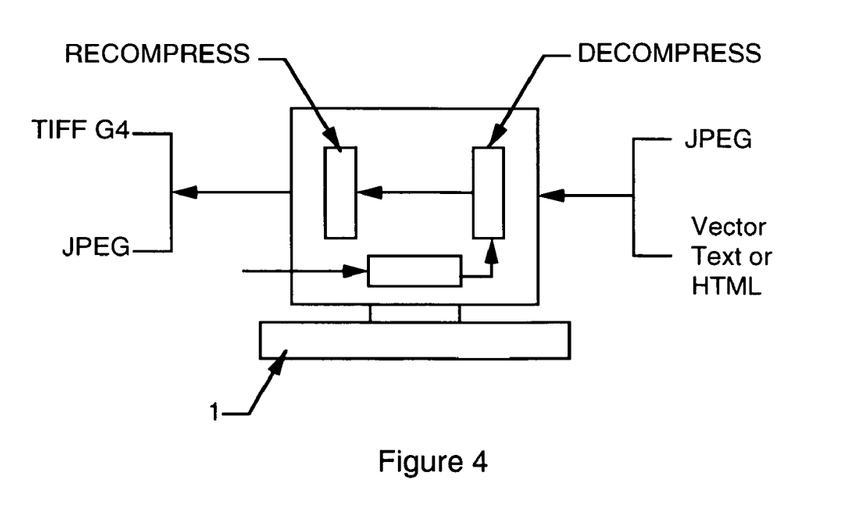
FIG. 4 illustrates file formats received and sent by the host computer.

The host computer receives vector information or compressed data from outside in the form of HTML, JPEG, etc., which is displayed on a web page. That image, in whole or parts, is recompressed and sent to the portable device. The recompressed data format sent to the portable device, is not necessarily in the same format as the compressed data format first received by the host computer, as illustrated in FIG. 4. For example, the incoming data from a Web page may be in the form of JPEG which is decompressed and displayed on the browser 2. This data is recompressed and sent to the portable device but can be in the form of TIFF G4 or other formats, and not necessarily JPEG as initially received.

Another embodiment involves the host computer receiving vector information such as HTML or text and then rasterizing it to bit map format. It can then shown in memory through the virtual browser and is recompressed through a "loss less" method and sent to the portable device.

Figure 3:
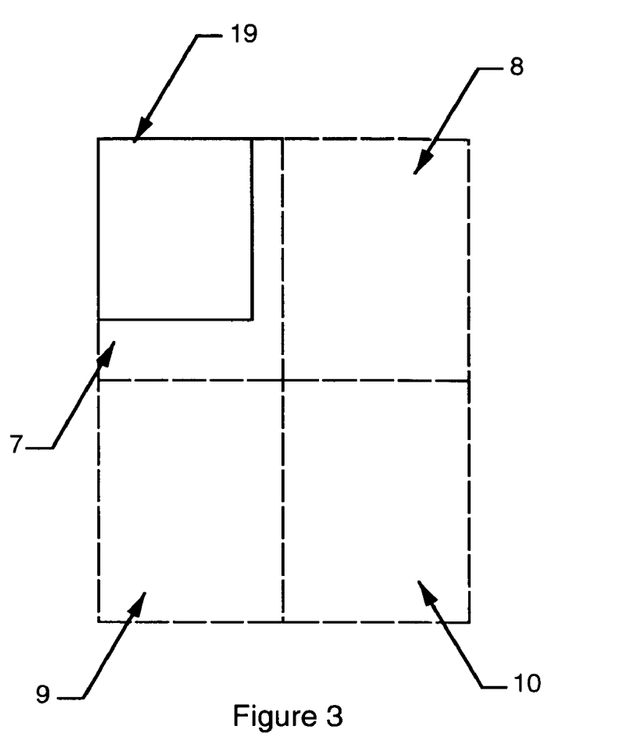
FIG. 3 illustrates a typical subdivision of the image to be displayed.

The image 5 is further divided into sections 7, 8, 9, and 10, as shown in FIG. 3. The image is divided after the bitmap or raster is created. The reason for the division (as will be explained later) is for the purpose of display priority on the user's display. The image 5 is then sent to another program 11 running on the host computer 1 (FIG. 1), which compresses the image using a loss-less compression method. The compression method may be group 3 or group 4, or another method. The information is received by a portable device 18 that has the ability to display an image, in its display window 19. The information is decompressed and displayed in the order of priority such that part of image 7, which substantially or completely covers the displayable area 19 (FIG. 2), of the portable device is decompressed and displayed first and then sequentially the portions 8, 9, 10 of the image are decompressed and stored in an internal memory of the portable device to be displayed later when the user scrolls up, down, or sideways to these parts of the image.

Figure 5:
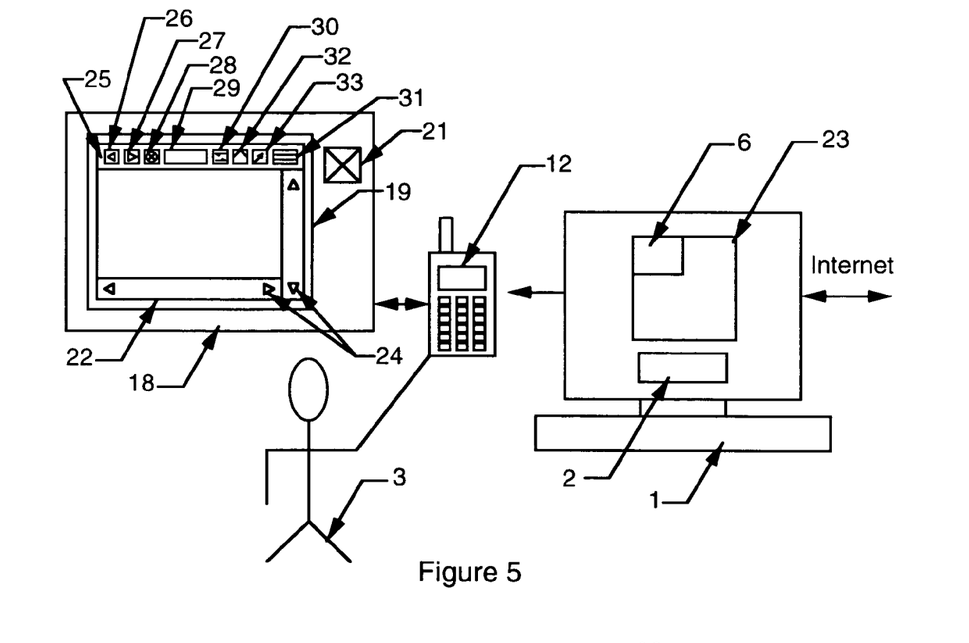
FIG. 5 illustrates the PDA browser software and PDA browser window in accordance with the present invention.
Figure 6:
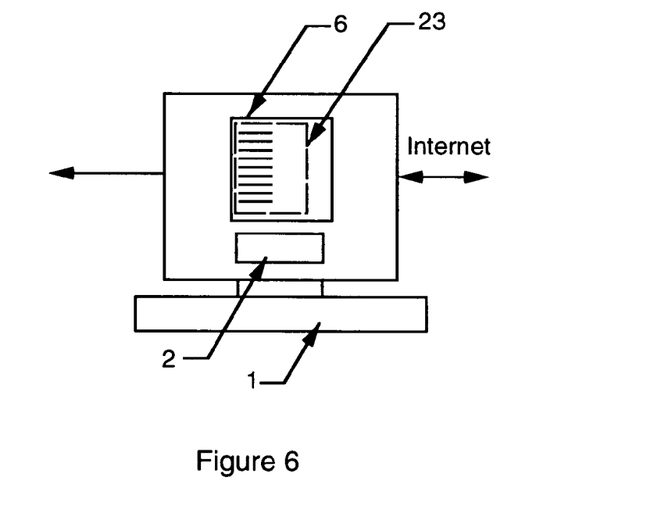
FIG. 6 illustrates formatting the liquid width of a web page in accordance with the present invention.

With further reference to the principle embodiment of the invention in accordance with FIG. 5, an application program 21 is installed and runs on the portable device 18. This application program 21 is referred to as the PDA browser software, which has its own window 22. The PDA browser software window 22 is adjustable in size and may be set to be larger or smaller than the size of the display window 19, but ideally it is set to be the same size as the display window 19. As previously mentioned, the window 6 of the browser 2 running in the host computer 1 may be set to be the same size as the display window 19 of the portable device 18, for formatting purposes. However, in the preferred embodiment the window 6 of the browser 2 running in the host computer 1 is set to be the same size as the PDA browser window 22. Hence the browser software 2 which takes a web page 23 from the Internet, renders it into memory, reduces the color depth and sends the image compressed to the portable device 18 is much different from the PDA browser software 21 which shows a web page image larger than the size of the PDA browser window 22. In particular, what the PDA browser software 21 facilitates is scrolling which is performed locally on the portable device 18 without the need for further communication between the device 18 and the host computer 1, after the image 23 is sent to the portable device. The application program 21, PDA browser software, runs locally on the portable device 18 whose window 22 is also implemented locally on the portable device, and within this window 22 the web page image 23 is movable at the device. The PDA browser software 21 gets the web page image 23 which was sent by the host computer 1, and this web page image resides locally in the memory of the portable device 18. What is unique about the invention here is that since the image of the web page 23 is shown in the PDA browser window 22, and the web page is larger than the PDA browser window, the scrolling of the web page is done on the device facilitated by the browser scroll bars 24 or other methods of scrolling. The host computer 1 is not involved in the scrolling function done locally at the portable device 18. The users 3 would have instantaneous scrolling at their disposal within the PDA browser window 22. Thus, the scroll bars 24 on the portable device 18 are only used for scrolling around the image locally on the device, and are not connected in any way to any scroll bars that may appear in the browser's window 6 residing in the host computer 1. Upon initiating a scrolling command on the remote device 18, a message is sent from the remote device to the host computer 1 informing of the new location the PDA browser window 22 has scrolled to, so that the browser window 6 on the host computer may also scroll to that precise location, though there may be a lag or time difference between the scrolling on the remote device and scrolling on the host computer. Since the scroll commands are sent first to the host computer, any click commands initiated by the user 3 after scrolling would be sent after the scroll commands, subsequently entered on the browser 2 of the host computer 1. Hence, the browser window 6 of the host computer 1 mirrors the PDA browser window 22, which are both set to be the same size in the preferred embodiment, SO that text can be formatted to comfortably fit the size of the web page displayed inside the PDA browser window 22, without being cut off at the left or right edges, making it easy to read. Formatting the width of the image in the browser window 6 in the host computer 1 is sometimes referred to as formatting the liquid width of the web page. The liquid width may be preset in the host computer 1. The portable device 18 may also originally identify the size of the PDA browser window 22 to the host computer 1 so that it may set the liquid width of the web page accordingly. A message may also be sent from the remote device 18 to increase or decrease the liquid width of the web page in the browser window 6 of the host computer 1 to allow text or images to be properly formatted to fit the PDA browser window 22. However, some graphics or forms may not fit in the desired liquid width though a substantial portion may be displayed in the PDA browser window 22. Information on each web page that is sent from the host computer to the portable device may be considered dynamic. Also, the size of each web page received from outside the host computer is dynamic, as the size of all web pages vary in width and length. Thus, the host computer gets a web page from outside and renders this into memory, whereby every web page it receives is of a different size. The size of the web page that is received from the outside is the same size that is sent to the portable device when converted to an image, and it varies with each web page received. Each web page is rendered into memory, reduced in color depth, compressed and sent to the portable device 18 by the host computer 1. Hence every page received and decompressed by the portable device 18 is of a different size. All of the information that is received by the browser 2 and rendered into memory in the host computer 1 is received from outside the host computer. Consequently, when the liquid width of the browser window 2 is made narrower, the length of the newly formatted web page would increase accordingly. Another way of doing this, in accordance with FIG. 6, is to set the size of the browser window 6 to be larger than most web pages 23. The host computer 1 also sets the liquid width of the web page 23, which is preset in the host computer to be the same width of the PDA browser window 22 on the portable device 18. Hence, the browser 2 is instructed to artificially format whatever it can to the desired liquid width. In performing this task, a substantial part of the image of the web page may be shown on the PDA browser window 22 of the portable device, without having to frequently scroll horizontally on the portable device as most text portions fit in the PDA browser window 22. However, certain graphics portions or headers may not fit in the PDA browser window 22 and horizontal scrolling may be required in these areas occasionally. Vertical scrolling is usually required. With further reference to the preferred embodiment of the invention and FIG. 5, a CPU resident in the portable device 18 therefore has the ability to decompress a bit map or raster image that may be larger than the size of the PDA browser window 22 and allows the user to traverse this bit map or raster image locally on the portable device. The primary method of traversing the image is through conventional scroll bars 24 positioned at the sides of the image inside the display screen 19 at the edges of the PDA browser window 22. However, buttons or icons residing outside the display screen 19 may also be used to scroll on the portable device, to enable the user to move the web page 23 relative to the PDA browser window 22 on the portable device 18. The CPU present in the portable device performs all scrolling functions, even though messages are sent to the host computer informing it of each scroll instruction. This allows the host computer to keep a track of the location of the portable device's PDA browser window 22 with respect to the web page. For every new web page transferred to the portable device, only the contents of the browser window 6 are transferred. Other items such as the title, scroll bars, menu items, icons, etc., are not sent to the portable device. In particular, a fixed area 25 exists inside the PDA browser window 22 at the top, which contains icons and an address input area which are not moveable. These icons and menu items are implemented on the portable device, and are sent once by the host computer to the portable device each time the device is powered on and initialized. Once the portable device receives the layout of these icons and menu items, they are stored into memory and displayed on the screen. Icons that exist in area 25 are typically back, forward, refresh, stop, go, etc., which are commonly used in regular internet browsers. Each of these ions in area 25 is mapped to similar corresponding icons which may be at different locations on the browser 2 in the host computer 1, such that by the user 3 clicking on any icon in area 25, a message is sent to the host computer informing it of the click location, and that click is implemented in the corresponding location on the browser 2, and a refreshed image is received by the browser 2 from outside and this is sent to the portable device 18, to be displayed in the PDA browser window 22. Similarly, text characters inputted in the text input area inside area 25 are sent as messages to the host computer which inputs these text characters in the corresponding text input area on the browser 2, which receives a refreshed image after the "go" or "enter" icon is clicked on the remote device 18.

In another embodiment, the layout of these icons and menu items in area 25 are hard coded in the memory of the portable device. Each time the device is powered on and initialized, these icons and menu items are retrieved from memory and displayed at the top of the PDA browser window 22, without any communication from the host computer.

With further reference to FIG. 5, the portable device 18 contains a fixed area 25 at the top of the PDA browser window 22, which is not moveable. Within area 25 the following icons are present and their respective functions described herein. Clicking on the "back" icon 26 on the portable device 18 sends a message to the host computer 1 to click on the corresponding "back" icon on the browser 2, which sends the previously displayed web page to the portable device. Clicking on the "forward" icon 27 on the portable device 18 sends a message to the host computer 1 to click on the corresponding "forward" icon on the browser 2, which sends the corresponding web page to the portable device. Clicking on the "stop" icon 28 on the portable device 18 sends a message to the host computer 1 to click on the corresponding "stop" icon on the browser 2, thus the host computer stops receiving the current web page from outside and also stops any transmission of a web page to the remote device. The image sent prior to clicking the "stop" icon 28 would remain on the display screen 19. Clicking on the "refresh" icon 30 on the portable device 18 sends a message to the host computer 1 to click on the corresponding "refresh" icon on the browser 2, which receives a refreshed image from outside and sends it to the portable device. Clicking on the "home" icon 32 on the portable device 18 sends a message to the host computer 1 to click on the corresponding "home" icon on the browser 2, which receives a refreshed home web page from outside and sends it to the portable device. Clicking on the "address input area" 29 on the portable device 18 automatically invokes a keyboard layout which is displayed inside the PDA browser window 22. When the user clicks on any text character on the keyboard it is processed by the CPU on the portable device and the corresponding text character appears inside the "address input area" 29. Upon clicking on the "go" icon 33 on the portable device 18, a message is sent to the browser 2 in the host computer 1 to go to the address that was last typed in the "address input area" 29 on the portable device 18. A refreshed web page is received from outside and is sent by the host computer 1 to the portable device 18. Clicking on the keyboard icon 31 on the portable device 18 invokes a keyboard layout, which is displayed inside the PDA browser window 22 to facilitate entry of characters that appear on the keyboard layout. When the keyboard layout is displayed inside the PDA browser window 22, clicking on the keyboard icon 31 on the portable device 18 would minimize the keyboard layout, removing it from the PDA browser window 22.

In a further embodiment of the invention, when the user clicks on an image of a web page on the screen of the portable device 18, a message is sent to the host computer 2 informing it of the exact click location relative to the PDA browser window 22, but the host computer already knows where the PDA browser window 22 is relative to the web page, as the previous scrolling action would have sent a message to the host computer informing where the PDA browser window 22 has scrolled to relative to the web page. If there was no scrolling action, the host computer would know the exact location of the PDA browser window 22 with respect to the web page, as this is where the first set of compressed data was sent to the portable device 18 from the host computer 1. This allows the host computer to deduce exactly where the click location occurred on the remote device 18 relative to the web page.

What is claimed is:

1. A method to view Internet content, the method comprising:
    displaying in a first portion of a display of a device a user interface image including one or more buttons for web browsing;
    sending a request for a web page from the device to a remote server;
    receiving at the device from the remote server in a compressed format a web page image, the web page image being rendered at the remote server from the entire web page which the remote server retrieves from the Internet in response to the request, the web page including text and graphics; and
    under exclusive control of the device, selectively displaying a portion of the web page image in a second portion of the display of the device according a user input to the device while the user interface image is displayed in the first portion of the display.

2. The method of claim 1, wherein said selectively displaying comprises:
    scrolling the web page image in the second portion of the display of the device at exclusive control of the device.

3. The method of claim 2, further comprising:
    sending, from the device to the remote server, data indicating scrolling of the web page image in the second portion of the display.

4. The method of claim 2, wherein the first and second portions are within a window of the display of device; and, the user interface image is displayed fixedly with respect to the window when the web page image is scrolled in the second portion of the display.

5. The method of claim 2, further comprising:
receiving a click at a location in the second portion of the display;
transmitting data indicating the click at the location to the remote server for applying a click on the web page at the remote server.

6. The method of claim 1, wherein the one or more buttons include at least one of:
a home button;
a back button;
a forward button;
a stop button;
a refresh button; and
a go button.

7. The method of claim 1, wherein the user interface image includes a keyboard icon, which when activated causes the device to display a keyboard layout on the display of the device.

8. The method of claim 7, wherein the user interface image includes an address input area for entering an address of the web page.

9. The method of claim 1, wherein the user interface image is stored in the device.

10. The method of claim 9, further comprising:
receiving at the device from the remote server the user interface image during initialization of the device for web accessing.

11. The method of claim 1, wherein the compressed format is loss-less.

12. A device to view Internet content, the device comprising:
means for displaying in a first portion of the display of a device a user interface image including one or more buttons for web browsing;
means for sending a request for a web page from the device to a remote server;
means for receiving at the device from the remote server in a compressed format a web page image, the web page image being rendered at the remote server from the entire web page which the remote server retrieves from the Internet in response to the request, the web page including text and graphics; and
means for selectively displaying a portion of the web page image, under exclusive control of the device, in a second portion of the display of the device according a user input to the device while the user interface image is displayed in the first portion of the display.

13. The device of claim 12, wherein said means for selectively displaying comprises:
means for scrolling the web page image in the second portion of the display of the device at exclusive control of the device.

14. The device of claim 13, further comprising:
means for sending data indicating scrolling of the web page image in the second portion of the display from the device to the remote server.

15. The device of claim 13, wherein the first and second portions are within a window of the display of device; and, the user interface image is displayed fixedly with respect to the window when the web page image is scrolled in the second portion of the display.

16. The device of claim 13, further comprising:
means for receiving a click at a location in the second portion of the display;
means for transmitting data indicating the click at the location to the remote server for applying a click on the web page at the remote server.

17. The device of claim 12, wherein the one or more buttons include at least one of:
a home button;
a back button;
a forward button;
a stop button;
a refresh button; and
a go button.

18. The device of claim 12, wherein the user interface image includes a keyboard icon, which when activated causes the device to display a keyboard layout on the display of the device.

19. The device of claim 18, wherein the user interface image includes an address input area for entering an address of the web page.

20. The device of claim 12, wherein the user interface image is stored in the device.

21. The device of claim 20, further comprising:
means for receiving at the device from the remote server the user interface image during initialization of the device for web accessing.

22. The device of claim 12, wherein the web page image is compressed using a loss-less method.

23. A machine readable medium containing executable computer program instructions which when executed by a data processing system cause said system to perform a method to view Internet content, the method comprising:
displaying in a first portion of a display of a device a user interface image including one or more buttons for web browsing;
sending a request for a web page from the device to a remote server;
receiving at the device from the remote server in a compressed format a web page image, the web page image being rendered at the remote server from the entire web page which the remote server retrieves from the Internet in response to the request, the web page including text and graphics; and
under exclusive control of the device, selectively displaying a portion of the web page image in a second portion of the display of the device according a user input to the device while the user interface image is displayed in the first portion of the display.

24. The medium of claim 23, wherein said selectively displaying comprises:
scrolling the web page image in the second portion of the display of the device at exclusive control of the device.

25. The medium of claim 24, wherein the method further comprises:
sending, from the device to the remote server, data indicating scrolling of the web page image in the second portion of the display.

26. The medium of claim 24, wherein the first and second portions are within a window of the display of device; and, the user interface image is displayed fixedly with respect to the window when the web page image is scrolled in the second portion of the display.

27. The medium of claim 24, wherein the method further comprises:
receiving a click at a location in the second portion of the display;
transmitting data indicating the click at the location to the remote server for applying a click on the web page at the remote server.

28. The medium of claim 23, wherein the one or more buttons include at least one of:
a home button;

a back button;
a forward button;
a stop button;
a refresh button; and
a go button.

29. The medium of claim 23, wherein the user interface image includes a keyboard icon, which when activated causes the device to display a keyboard layout on the display of the device.

30. The medium of claim 29, wherein the user interface image includes an address input area for entering an address of the web page.

31. The medium of claim 23, wherein the user interface image is stored in the device.

32. The medium of claim 31, wherein the method further comprises:
   receiving at the device from the remote server the user interface image during initialization of the device for web accessing.

33. The medium of claim 23, wherein the compressed format is loss-less.

* * * * *